United States Patent [19]
Clendinning et al.

[11] Patent Number: 4,766,197

[45] Date of Patent: Aug. 23, 1988

[54] MODIFIED POLY(ARYL ETHER KETONES) DERIVED FROM BIPHENOL

[75] Inventors: Robert A. Clendinning, New Providence; Donald R. Kelsey, Somerville, both of N.J.

[73] Assignee: Amoco Corporation, Chicago, Ill.

[21] Appl. No.: 924,068

[22] Filed: Oct. 28, 1986

[51] Int. Cl.[4] ............................................. C08G 65/40
[52] U.S. Cl. ................................. 528/125; 528/126; 528/128; 528/219
[58] Field of Search ............... 528/125, 126, 128, 219

[56] References Cited

U.S. PATENT DOCUMENTS 4,320,224  3/1982  Rose et al. ........................... 528/125
4,339,568  7/1982  Maresca ............................... 528/126

FOREIGN PATENT DOCUMENTS 0184458  6/1985  European Pat. Off. .
1414421  11/1975  United Kingdom ............... 528/125

*Primary Examiner*—John Kight
*Assistant Examiner*—M. L. Moore
*Attorney, Agent, or Firm*—Donald M. Papuga; William H. Magidson; Ralph C. Medhurst

[57] ABSTRACT

Described herein are poly(aryl ether ketones) derived from biphenol which can be improved by incorporating bisphenol comonomers. The resulting polymers have lower melting points while the Tg is essentially unchanged resulting in good mechanical and crystallization properties.

6 Claims, No Drawings

MODIFIED POLY(ARYL ETHER KETONES) DERIVED FROM BIPHENOL

FIELD OF THE INVENTION

Described herein are modified crystalline poly(aryl ether ketones) derived from biphenol, having improved processability. The modification comprises the incorporation of bisphenol comonomers.

BACKGROUND OF THE INVENTION

Poly(aryl ether ketones) are known crystalline polymers. They offer an exceptional balance of properties; namely high melting point, exceptional thermal stability, excellent hydrolytic stability, high stiffness and strength, good toughness and excellent solvent and environmental stress rupture resistance.

Poly(aryl ether ketones) are known in the art as evidenced by Johnson et al, U.S. Pat. Nos. 4,108,837 and 4,174,175; Dahl, U.S. Pat. No. 3,953,400; Dahl et al U.S. Pat. No. 3,956,240; Dahl, U.S. Pat. No. 4,247,682; Rose et al., U.S. Pat. No. 4,320,224; Moresca U.S. Pat. No. 4,339,568; Attwood et al., Polymer, 1981, vol. 22, August, pp. 1096–1103; Blundell et al., Polymer, 1983 vol. 24, August, pp. 953-958; Attwood et al., Polymer Preprints, 20, no. 1, April, 1979, pp. 191–194; and Rueda et al., Polymer Communications, 1983, vol. 24, September, pp. 258–260.

Thus, poly(aryl ether ketones) are well known; they can be made from a variety of starting materials; and they can be made with different melting temperatures and molecular weights. Nominally, poly(aryl ether ketones) are crystalline and can be made tough, i.e., exhibit high values (50 ft-lbs/in$^2$) in the tensile impact test (ASTM D-1822). They have many uses and may be fabricated into any desired shape, e.g., moldings, coatings, films, or fibers.

Poly(aryl ether ketones) prepared from biphenol as a starting monomer have excellent mechanical properties. However, the melting points of such polymers are over 400° C. Such high molecular weight polymers are difficult to prepare due to the high polymerization temperatures required. Further, due to their high melting points, fabrication by conventional polymer fabrication methods is difficult.

Thus, there is a desire to lower the melting point of the poly(aryl ether ketone) derived from biphenol without substantially affecting the glass transition temperature (Tg) and, thus, the mechanical and crystallization properties.

THE INVENTION

It has now been found that the processability of poly(aryl ether ketones) derived from biphenol can be improved by incorporating bisphenol comonomers. The resulting polymers have lower melting points while the Tg is essentially unchanged resulting in good mechanical and crystallization properties.

In a preferred embodiment, it has been found that incoporation of aryl sulfone units or phenylene ether units, specifically by substituting dihydroxydiphenyl sulfone or hydroquinone for part of the biphenol, in the poly(aryl ether ketone) derived from biphenol results in high molecular weight crystalline polymers which still retain high melting points and which can be prepared at reaction temperatures of about 350° C. or less.

The polymers of this invention have high melting points of about 300° C. or above, moderate to good crystallinity, and can be made easily with high molecular weights (which are exceedingly difficult to obtain from poly(aryl ether ketones) prepared solely from biphenol).

The poly(aryl ether ketone) polymers derived from biphenol comprise at least one 1,4-biphenylene unit and 1,4-phenylene units, said units separated by ether oxygen and wherein the polymer contains at least one divalent carbonyl radical separating the units.

The poly(aryl ether ketone) which may be modified herein are characterized as containing the following repeating unit:

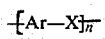

wherein n is 2 or greater, Ar is phenylene or biphenylene, with the proviso that at least one of Ar is biphenylene and X is —O—, or

with the proviso that at least one X is

Illustrative of such poly(aryl ether ketones) are the following:

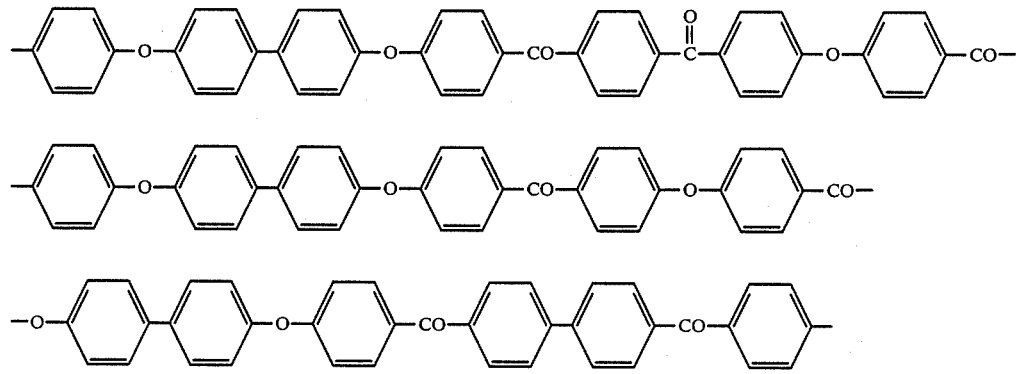

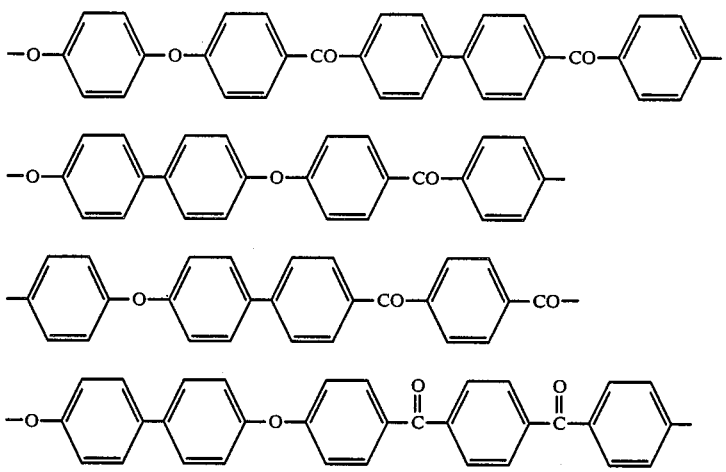

The preferred starting monomers which are used to prepare the poly(aryl ether ketones) include the following:

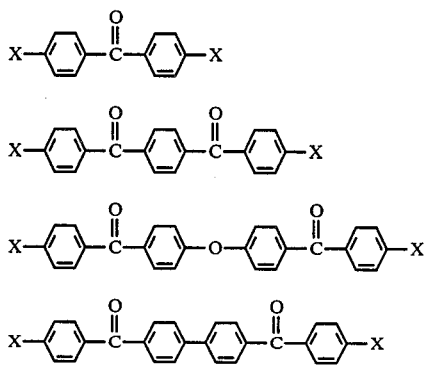

wherein X is chlorine or fluorine, and

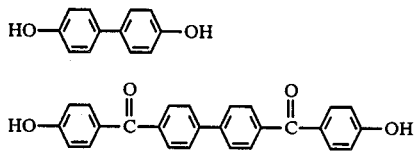

The modifying comonomers which are added to the reaction to modify the biphenol containing poly(aryl ether ketone) include the following:

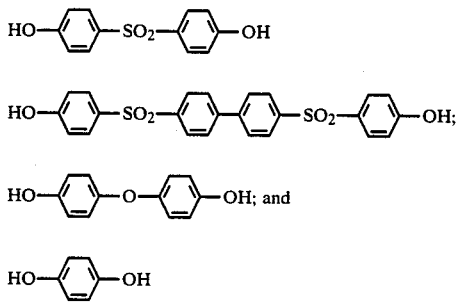

The amount of modifying bisphenol used to prepare the copolymers of this invention is such that the molar ratio (M/B) of comonomer (M) to biphenol (B) is from about 75/25 to about 5/95, preferably from about 50/50 to about 10/90, such that the melting point of the resulting copolymer is greater than about 300° C. and less than about 400° C. When the sulfone-containing bisphenol comonomer is used, the preferred M/B ratio is from about 30/70 to about 10/90, and the most preferred ratio is from about 20/80 to about 10/90 resulting in copolymers having a melting point above 300° C. and acceptable crystallization characteristics.

The copolymers of this invention may be characterized as containing units of the following formula:

$$\{Ar-X-Ar(-O-Ar)_mO\}\{Ar''-X-Ar'-O-Ar''(Ar')_nO\}$$

wherein Ar is independently phenyl or biphenyl; X is independently —CO— or —CO—Ar—CO—; Ar' is independently —O—Ar— or —SO$_2$—Ar—; Ar" is independently phenyl or biphenyl, with the proviso that at least one of the Ar's is biphenyl; n is 0 to 2, and m is 0 or 1.

The copolymers of this invention preferably contain units of the following formula:

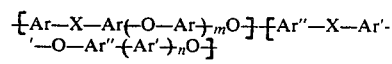

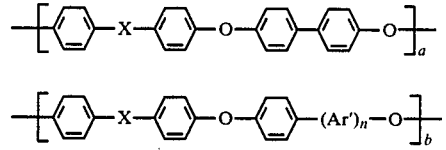

where in Ar' and X are defined as above; n is 0 to 2 and the ratio of a/b is 0.33 or greater, preferably 1.0 or greater.

The polymers of the instant invention are prepared in solution by heating a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C., the water should be removed, e.g., by heating under reduced pressure, prior to reaching the polymerization temperature.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, when using the monomeric or oligomeric diphenols of the instant invention there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

The reaction may also be carried out by heating a mixture of the monomers in the presence of sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium fluoride or chloride employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, it has been observed that the chloride salts are less active than the fluoride salts so that more chloride and less fluoride is used.

The reaction is carried out in the presence of an inert solvent.

Preferably the solvent employed is an aliphatic or aromatic sulfoxide or sulfone of the formula

where x is 1 or 2 and R and R' are alkyl or aryl groups and may be the same or different. R and R' may together form a divalent radical. Preferred solvents include dimethyl sulfone, sulfolane (1,1 dioxothiolan), or aromatic sulfones of the formula:

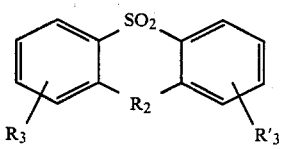

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include high boiling amides, e.g. N-cyclohexyl-2-pyrrolidone, N-phenyl-2-pyrrolidone, and the like.

The polymerization temperature is in the range of from about 100° to about 400° C. and will depend on the nature of the reactants and the solvent employed. The preferred temperature is above 270° C. The reactions are generally performed under atmospheric pressure. However, higher or lower pressures may be used.

For the production of some polymers, it may be desirable to commence polymerization at one temperature, e.g., between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The polymerization reaction may be terminated by mixing a suitable end capping reagent, e.g., a mono or polyfunctional halide such as methyl chloride, or 4,4'-dichlorodi-phenylsulphone with the reaction mixture at the polymerization temperature, heating for a period of up to one hour at the polymerization temperature and then discontinuing the polymerization.

EXAMPLES

The following examples serve to give specific illustrations of the practice of this invention but they are not intended in any way to limit the scope of this invention.

EXAMPLE 1

A 500 ml resin kettle was fitted with a stainless steel stirrer, stainless steel gas inlet tube, a stainless steel thermocouple connected to a temperature indicator-controller, and a Dean-Stark trap topped by a condenser. The resin kettle was charged with:

| | | |
|---|---|---|
| Hydroquinone | 16.52 g | 0.15 moles |
| Biphenol | 9.31 g | 0.05 moles |
| 4,4'-Difluoro-benzophenone | 43.64 g | 0.20 moles |
| Sodium carbonate | 20.56 g | 0.194 moles |
| Potassium carbonate | 1.382 g | 0.010 moles |
| Diphenyl sulfone | 143.4 g | |

The reaction mixture was heated to 200° C. and maintained there for one hour. The temperature was then raised to 250° for 15 minutes and then to 320° C. It was held at 320° for one hour, then cooled and let stand under nitrogen at room temperature overnight. The next day it was reheated to 320° C. and held there for 2.5 hours for a total of 3.5 hours at 320° C. The reaction was terminated by the addition of 2 g of 4,4'-dichlorodiphenyl sulfone followed by heating for an additional 0.5 hours at 320° C.

The hot contents of the resin kettle were poured into a teflon coated pan and the resulting cooled solid ground in a Wiley Mill. The granular product was extracted two times for one hour with boiling acetone and two times for an hour with boiling water.

The resulting polymer had a reduced viscosity (RV) of 1.38 dl/g (1% in concentrated sulfuric acid at 25° C.) and a melting point (M.P.) of 298° C. by DSC. The results are shown in Table I.

EXAMPLE 2

Example 1 was repeated except the charge was modified as follows:

| | | |
|---|---|---|
| Hydroquinone | 11.01 g | 0.1 mole |
| Biphenol | 18.62 g | 0.1 mole |

The resulting polymer had, after 3.5 hours at 320° C., an RV of 2.00 dl/g (1% in concentrated sulfuric acid at 25° C.) and a M.P. of 312° C. by DSC. The results are shown in Table I.

EXAMPLE 3

Example 1 was repeated except the charge was modified as follows:

| | | |
|---|---|---|
| Hydroquinone | 5.51 g | 0.05 moles |
| Biphenol 27.93 g | 27.93 g | 0.15 moles |

The reaction mixture was heated for about four hours at 320° C. The resulting polymer had an RV of 1.59 dl/g (1% in concentrated sulfuric acid at 25° C.) and a M.P. of 383° C. by DSC. The results are shown in Table I.

CONTROL A

Example 1 was repeated except the charge was modified as follows:

| | | |
|---|---|---|
| Hydroquinone | 0.00 g | 0.00 moles |
| Biphenol | 37.62 g | 0.20 moles |

The reaction mixture was heated at 320° C. for 2.5 hours and 340° C. for 1.5 hours. The resulting polymer had an RV of 0.97 dl/g (1% in concentrated sulfuric acid at 25° C.) and a M.P. of 428° C. by DSC. The results are shown in Table I.

CONTROL B

Example 1 was repeated except the charge was modified as follows:

| | | |
|---|---|---|
| Hydroquinone | 22.02 g | 0.20 moles |
| Biphenol | 0.00 g | 0.00 moles |

The reaction mixture was heated at 320° C. for 3 hours. The resulting polymer had an RV of 1.18 dl/g (1% in concentrated sulfuric acid at 25° C.) and a M.P of 335° C. by DSC. The results are shown in Table I.

The date in Table I shows that a poly(aryl ether ketone) derived from biphenol (Control A) has a very high melting point of 428° C. Substituting hydroquinone for the biphenol (Examples 1 to 3) lowers the melting point of the polymer.

TABLE I

| Example | 1 | 2 | 3 | Control A | Control B |
|---|---|---|---|---|---|
| Hydroquinone | 0.15 | 0.10 | 0.05 | 0 | 0.20 |
| Biphenol | 0.05 | 0.10 | 0.15 | 0.20 | 0 |
| 4,4'-Difluoro-benzophenone | 0.20 | 0.20 | 0.20 | 0.20 | 0.20 |
| RV (dl/g) | 1.38 | 2.00 | 1.59 | 0.97 | 1.18 |
| MP (°C.) | 298 | 312 | 383 | 428 | 335 |

CONTROL C

The polyether from biphenol and 1,4-bis(4'-fluorobenzoyl)benzene was prepared in a manner similar to that of Example 1 except that the charge was:

| | gms | moles |
|---|---|---|
| Biphenol | 13.97 | 0.0750 |
| 1,4-bis(4'-fluoro-benzoyl)benzene | 24.17 | 0.0750 |
| Sodium carbonate | 7.712 | 0.0728 |
| Potassium carbonate | 0.518 | 0.0037 |
| Diphenyl sulfone | 140 | |

The polymerization was conducted at 340° C. for 2.5 hours and at 365° C. for an additional 1.25 hours. The polymer had an RV of 1.09 dl/g (1% in concentrated sulfuric acid at 25° C.) and a M.P. of 436° C. by DSC.

EXAMPLE 4

Copolymer from 1,4-Bis(4-fluorobenzoyl)Benzene

The polymerization of Example 1 was repeated using 0.1005 mole (32.36 gm) 1,4-bis(4-fluorobenzoyl)benzene, 0.08 mole (14.90 gm) biphenol, 0.02 mole (5.01 gm) bisphenol-S, 0.095 mole (10.07 gm) sodium carbonate, 0.007 mole (0.97 gm) potassium carbonate and 110 gm biphenyl sulfone to give a polymer yield of 33.5 gm after extraction and drying. The RV was 1.35 dl/g. A compression molded 10 mil film gave the following properties:

| | |
|---|---|
| Tensile modulus | 336,000 psi |
| Tensile strength | 10,000 psi |
| Elongation | 5.5 psi |
| Pendulum Impact | 71 ft-lb/in$^3$ |
| Tg | 190° C. |
| Tm | 390° C. |

EXAMPLE 5

Copolymer from Difluorobenzophenone

A 250 ml, 3-neck (angled side necks) flask fitted with a mechanical SS stirrer, thermocouple probe and adapter, and a Claisen arm with nitrogen inlet tube and condenser was charged with recrystallized difluorobenzophenone (17.46 gm, 0.08 mole), recrystallized biphenol (11.92 gm, 0.064 mole), dihydroxydiphenyl sulfone (4.00 gm, 0.016 mole), potassium carbonate (1.52 gm, 0.011 mole, ground and dried), sodium carbonate (7.63 gm, 0.072 mole, ground and dried), and diphenyl sulfone (105 gm). A firestone valve was connected to the top of the condenser and the apparatus was evacuated and filled with argon five times, ultra pure nitrogen flow through the inlet tube was begun, and the connection to the Firestone valve replaced with a bubbler. The solid contents of the flask was heated carefully with a mantle until melting occurred at about 115°–125° C. and stirring was begun. The reaction mixture was heated to 200° and maintained at 200° for 30 minutes using a temperature controller. The reaction mixture was then heated to 250°, held on hour, heated to 290°, held 38 mins, heated to 320°–330°, and held. After about 35 minutes at this temperature, the reaction mixture was very thick and was poured and scraped out of the flask. The cool mass was ground to a fine powder, and refluxed and stirred successfully (500–600 ml, 1 hour) with acetone twice, water, 1% aqueous hydrochloric acid, water, and acetone. The isolated polymer was dried at 120° in a vacuum oven overnight to give 28.2 gm (94% yield).

The reduced viscosity (RV) of a 1% solution of polymer in concentrated sulfuric acid at 25° C. was 1.58 dl/g; no gel was observed.

A tough, compression molded 20 mil film was crystalline as molded and exhibited 255,500 psi tensile modulus, 11,250 psi tensile strength, 31.5% elongation, and 159 ft-lb/in$^3$ pendulum impact. Differential scanning calorimetry gave a Tg=175° C., melting point 352° C., heat of crystallization 4.9 cal/gm, and a crystallization time of 198 seconds at 260° C.

EXAMPLES 6–10

The polymerization was conducted essentially as in Example 5, using higher ratios of biphenol to bisphenol-S. The properties are summarized in Table II. Note that at the higher biphenol content, the polymer melting point is higher and, in general, the crystallization rate is also improved. At 90 mole % biphenol, the polymer RV was lower due to crystallization of this high melting polymer at the polymerization temperatures of 320°–330° C. [Example 8 used potassium fluoride in place of potassium carbonate.]

TABLE II
BIPHENOL/BISPHENOL-S POLYKETONES FROM DIFLUOROBENZOPHENONE

| EXAMPLE | 6 | 7* | 8 | 9 | 10 |
|---|---|---|---|---|---|
| Biphenol/Bis-S** Ratio | 90/10 | 87.5/12.5 | 85/15 | 85/15 | 80/20 |
| RV | 1.09 | 1.85 | 1.55 | 1.74 | 1.58 |
| Tensile Modulus, psi | — | 288,000 | — | 295,000 | 255,000 |
| Tensile Strength, psi | — | 10,800 | — | 12,000 | 11,250 |
| Elongation, % | — | 8.5 | — | 9 | 31.5 |
| Pendulum Impact, ft-lb/in$^3$ | — | 125 | — | 88 | 159 |
| Tg (°C.) | — | — | 172 | — | 175 |
| Tm (°C.) | 391 | — | 362 | — | 352 |
| Hf | 6.9 | — | 4.8 | — | 4.9 |
| Tc (°C.) | 347 | — | 287 | — | 259 |
| Hc | 8.7 | — | 5.3 | — | 3.8 |
| t$_c$ (sec/°C.) | 180/360 86/358 60/340 | — | 210/300 | — | 247/270 198/260 |
| Melt flow (10 P @ 400° C.) | 2.31 | 26.4 | 14.1 | — | 2.73 |

*Properties on 10 mil film.
**Bis-S = dihydroxydiphenyl sulfone

EXAMPLES 11–13

Copolymer from Dichlorobenzophenone

Polymerizations were conducted essentially as in Example 5, using dichlorobenzophenone in place of difluorobenzophenone. High molecular weight crystalline polymers were obtained (Table III).

TABLE III
BIPHENOL/BISPHENOL-S POLYKETONES FROM DICHLOROBENZOPHENONE

| Examples | 11 | 12 | 13 |
|---|---|---|---|
| Biphenol/Bis-S Ratio | 85/15 | 85/15 | 75/25 |
| RV | 2.25 | 2.77 | 1.60 |
| Tensile Modulus, psi | 268,000 | 280,000 | 235,200 |
| Tensile Strength, psi | 12,500 | 12,000 | 8,600 |
| Elongation, % | 7.6 | 11.2 | 9.3 |
| Pendulum Impact, ft-lb/in$^3$ | 100 | 83 | 130 |

EXAMPLES 14–15

Copolymer using Dichlorodiphenylsulfone

Two attempts were made to prepare sulfone-ketone copolymers, using dichlorodiphenylsulfone (DCDPS) as the source of the sulfone unit in place of dihydroxydiphenyl sulfone. Thus, polymerization, using 0.1 mole fraction DCDPS and 0.9 mole fraction difluorobenzophenone with 1.0 mole equivalent biphenol at 340°, resulted in low molecular weight polymer (RV=0.48). A second run, using 0.15 mole fraction DCDPS and 0.85 mole fraction difluorobenzophenone, gave a polymer with RV=0.81 dl/g after 3 hours at 320°–30° C. which was too brittle to test.

What is claimed is:

1. A poly(aryl ether ketone) having a melting point greater than about 300° C. and less than about 400° C. and containing units of the following formula:

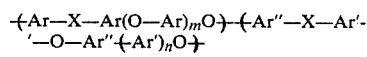

wherein Ar is independently phenyl or biphenyl; X is independently —CO— or —CO—Ar—CO—; Ar' is independently —O—Ar or —SO₂—Ar—; Ar" is independently phenyl or biphenyl, with the proviso that at least one of the Ar's is biphenyl; n is 0 to 2, and m is 0 or 1.

2. A poly(aryl ketone) as defined in claim 1 containing units of the following:

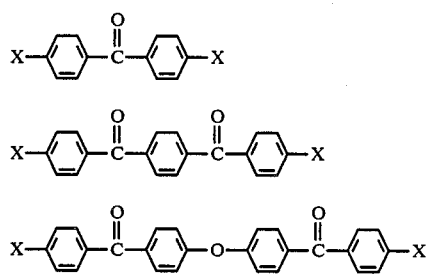

wherein the ratio of a to b is 0.33 or greater.

3. A poly(aryl ether ketone) derived from the reaction of one or more of the following:

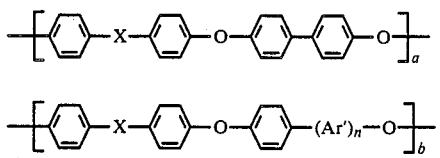

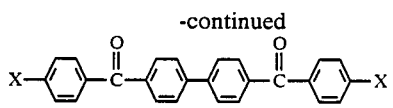

wherein X is chlorine or fluorine, with one or more of the following monomers:

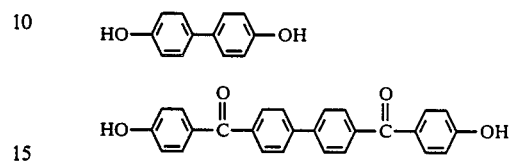

and at least one of the following monomers:

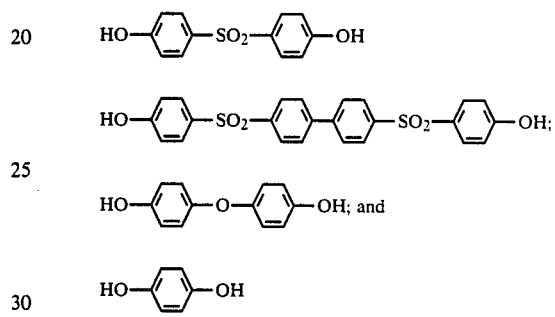

4. A poly(aryl ether ketone) of the following formula:

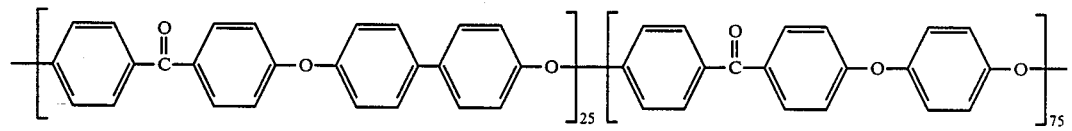

5. A poly(aryl ether ketone) of the following formula:

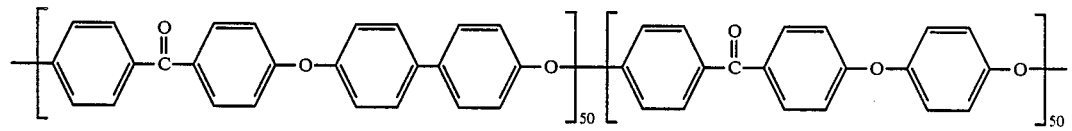

6. A poly(aryl ether ketone) of the following formula:

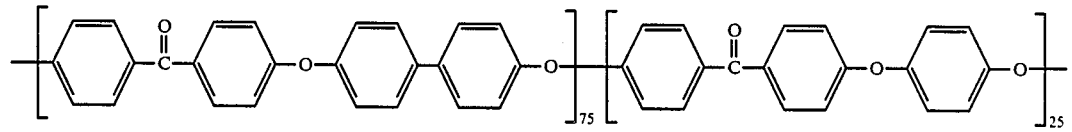

* * * * *